US012697565B2

(12) United States Patent
Shih et al.

(10) Patent No.: US 12,697,565 B2
(45) Date of Patent: Aug. 4, 2026

(54) MIXING DISK ASSEMBLY FOR USE ON CENTRIFUGAL PLATFORM

(71) Applicant: Feng Chia University, Taichung City (TW)

(72) Inventors: Chih-Hsin Shih, Taichung City (TW); Chia-Tse Shih, Taichung City (TW)

(73) Assignee: Feng Chia University, Taichung City (TW)

( * ) Notice: Subject to any disclaimer, the term of this patent is extended or adjusted under 35 U.S.C. 154(b) by 366 days.

(21) Appl. No.: 18/607,886

(22) Filed: Mar. 18, 2024

(65) Prior Publication Data

US 2025/0269301 A1 Aug. 28, 2025

(30) Foreign Application Priority Data

Feb. 27, 2024 (TW) ................................. 113107125

(51) Int. Cl.
B01D 15/16 (2006.01)
B01D 15/18 (2006.01)
(Continued)

(52) U.S. Cl.
CPC ....... B01D 15/166 (2013.01); B01D 15/1814 (2013.01); B01D 15/1892 (2013.01);
(Continued)

(58) Field of Classification Search
CPC .............. B01D 15/166; B01D 15/1814; B01D 15/1892; B01D 15/247; B01D 15/1894;

B01L 3/50273; B01L 2300/0803; B01L 2300/087; B01L 2400/0412; G01N 30/38; G01N 30/34; G01N 2030/027;
(Continued)

(56) References Cited

U.S. PATENT DOCUMENTS 4,900,435 A * 2/1990 Anderson .......... B01D 15/1892
210/198.2
6,302,134 B1 * 10/2001 Kellogg ................. H01R 39/64
137/251.1

(Continued)

OTHER PUBLICATIONS

Vazquez et al. "Centrifugally-driven sample extraction, preconcentration and purification in microfluidic compact discs" Trends in Analytical Chemistry, vol. 30, No. 10, (Year: 2011).*
(Continued)

*Primary Examiner* — Liam Royce
(74) *Attorney, Agent, or Firm* — Best & Flanagan LLP

(57) ABSTRACT

A dynamic mixing disk assembly for a centrifugal platform has an inner disk and an outer disk. The inner disk comprises a first ring part and a second ring part configured to an outer periphery circumference of the first ring part. The first ring part comprises multiple or at least two pawls. The outer disk is rotatably disposed on the second ring part of the inner disk. The outer disk comprises multiple tapered recesses or at least two tapered recesses. When the pawls are engaged with the tapered recesses of the outer disk, the inner disk and the outer disk are able to rotate synchronously with the centrifugal platform. When the inner disk is stopped by the centrifugal platform, the outer disk will keep rotating, and the pawls disengage from the tapered recesses and move to the next tapered recesses.

12 Claims, 7 Drawing Sheets

(51) Int. Cl.

| | |
|---|---|
| *B01D 15/24* | (2006.01) |
| *B01F 33/30* | (2022.01) |
| *B01F 101/23* | (2022.01) |
| *B01L 3/00* | (2006.01) |
| *G01N 30/02* | (2006.01) |
| *G01N 30/38* | (2006.01) |

(52) U.S. Cl.
CPC ........ *B01D 15/247* (2013.01); *B01L 3/50273* (2013.01); *G01N 30/38* (2013.01); *B01D 15/1894* (2025.01); *B01F 33/30* (2022.01); *B01F 2101/23* (2022.01); *B01L 2300/0803* (2013.01); *B01L 2300/087* (2013.01); *B01L 2400/0412* (2013.01); *G01N 2030/027* (2013.01); *G01N 2030/381* (2013.01)

(58) Field of Classification Search
CPC ........ G01N 2030/381; G01N 2030/347; B01F 33/30; B01F 2101/23; B01F 31/10
See application file for complete search history.

(56) References Cited

U.S. PATENT DOCUMENTS

| | | | | |
|---|---|---|---|---|
| 2002/0137218 | A1* | 9/2002 | Mian ................. | B01F 35/71805 |
| | | | | 436/45 |
| 2003/0207457 | A1* | 11/2003 | Kopf-Sill .......... | B01L 3/502738 |
| | | | | 436/45 |
| 2004/0089616 | A1* | 5/2004 | Kellogg ................. | G01N 21/07 |
| | | | | 210/600 |
| 2004/0099310 | A1* | 5/2004 | Andersson ........ | B01L 3/502738 |
| | | | | 137/240 |

OTHER PUBLICATIONS

Shih et al. "Design and development of a modular centrifugal platform with adjustable mixing and automated position-switching for stepwise gradient elution in reversed-phase liquid chromatography" Lab Chip, 25, 2098 (Year: 2025).*

* cited by examiner

MIXING DISK ASSEMBLY FOR USE ON CENTRIFUGAL PLATFORM

FIELD OF INVENTION

The present invention relates to a mixing disk assembly, more particularly to a mixing disk assembly for liquid chromatography with stepwise gradient elution on a centrifugal platform.

BACKGROUND OF THE INVENTION

In liquid chromatography technology, substances in a sample can be separated more effectively by gradually changing the composition of an eluent. In some of the conventional method, mixing of the multiple eluents needs to be carried out through high precision syringes and mixers. Not only do such approaches involve with complex and precise control steps, but there are also high risks of cross-contamination when collecting the eluates after the separation.

In view of the foregoing, there is an urgent need in the technology to provide a device or an assembly which can be introduced to an automated process by reducing operational steps and saving chromatographic analysis costs or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

In order to overcome the aforementioned shortcomings of the prior arts, the main purpose of the present invention is to provide a mixing disk assembly for use on a centrifugal platform, comprising an inner separation disk and an outer collection disk. The inner separation disk has a first ring part and a second ring part disposed on the outer periphery of the first ring part, with the first ring part having multiple pawls. The first ring part of the inner separation disk is provided with at least two eluent reservoirs, at least two recovery chambers, and at least one mixing chamber, the at least two eluent reservoirs being in fluid communication with the at least two recovery chambers and the at least one mixing chamber through at least two metering units, and the at least one mixing chamber being in fluid communication with a siphoning channel and a separation column. An outer collection disk rotatably mounted on the second ring part of the inner separation disk, the outer collection disk having multiple tapered recesses such that when the multiple pawls of the first ring part engage some of the multiple tapered recesses, the outer collection disk rotates synchronously with the inner separation disk, wherein each fraction collector comprises a feeding channel and multiple collecting chambers; and the outer collection disk has multiple fraction collectors in fluid communication with the separation column through the collection tube. When a rotational speed difference between the inner separation disk and the outer collection disk occurs, it will cause the outer collection disk to rotate relative to the inner separation disk and allow the pawl to exit from one tapered recess and switch to another or the following tapered recess.

From the above description, it can be seen that the mixing disk assembly of the present invention enables the use of different inner separation disks in conjunction with the outer collection disk to obtain different compositions of eluents and even achieve stepwise gradient elution. Furthermore, the mixing disk assembly of the present invention integrates centrifugal force and Coriolis force to induce proportional metering distribution, thereby enabling control of the composition of eluents by adjusting the operating conditions of the centrifugal platform. Lastly, the mixing disk assembly of the present invention employs a rotational switching system based on a ratchet mechanism that enables automatic switching of the combined inner separation disk and outer collection disk through rotational inertia changes induced by deceleration or sudden stop of the centrifugal platform, thereby achieving an automated centrifugal chromatography platform.

The present invention introduces an automatic separation or chromatographic process for reducing the cost of the conventional chromatographic analysis operated by precision syringes and the mixers. On the other hand, by adjusting the rotational speed of the centrifugal platform, the composition of the mixed eluent can be controlled, thereby facilitating gradient elution on the centrifugal platform, and by the ratchet mechanism, the automatic switching of the fraction collector can be achieved by the change of rotational inertial force reducing cross-contamination during eluate collection. Therefore, the mixing disk assembly of the present invention can replace conventional elution methods.

In the use of the present invention, in order to collect the eluates separately with the eluent of different compositions, a preferred embodiment is to add a first eluent and a second eluent and operate at different rotational speeds in order to produce eluents with different compositions. Furthermore, continuous collection of different eluates can be achieved by rotating the outer collection disk so that different eluates can be collected separately at different fraction collectors.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
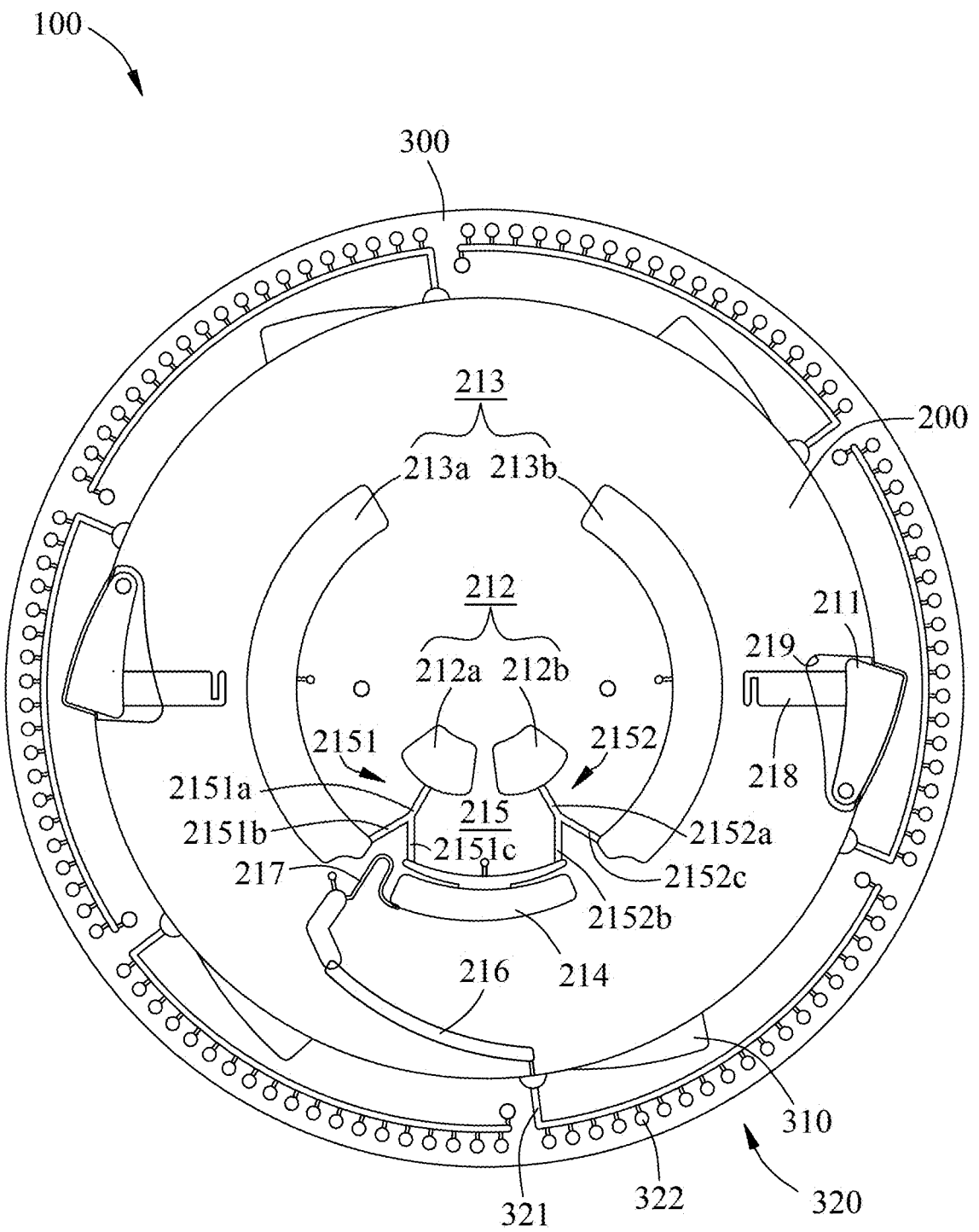
FIG. 1 is a top view of the mixing disk assembly of the present invention.
Figure 2A:
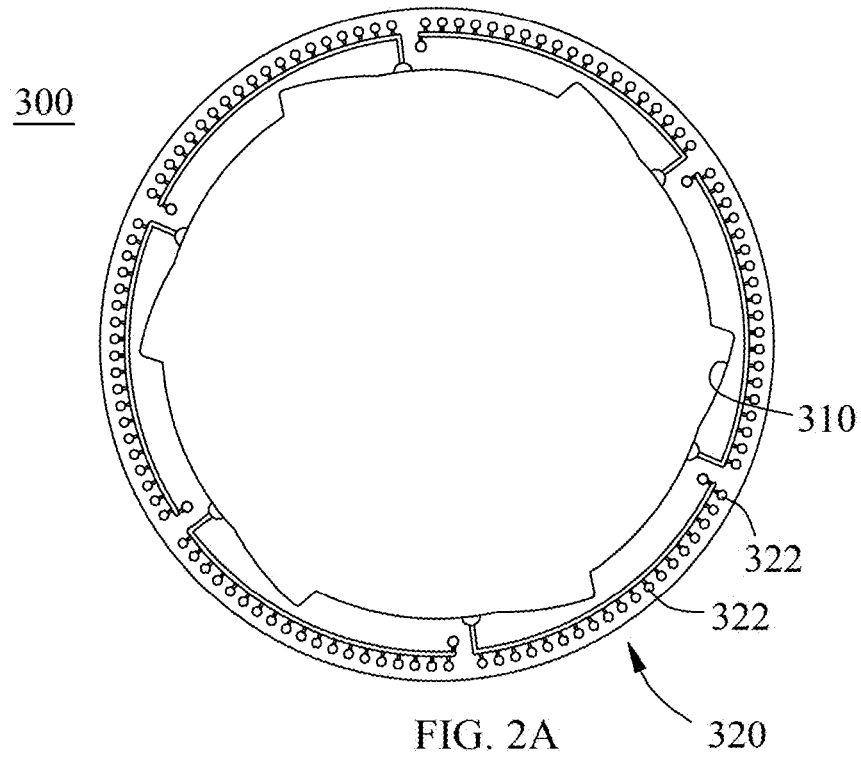
FIG. 2A is a top view of the outer collection disk of the mixing disk assembly of the present invention.
Figure 2B:
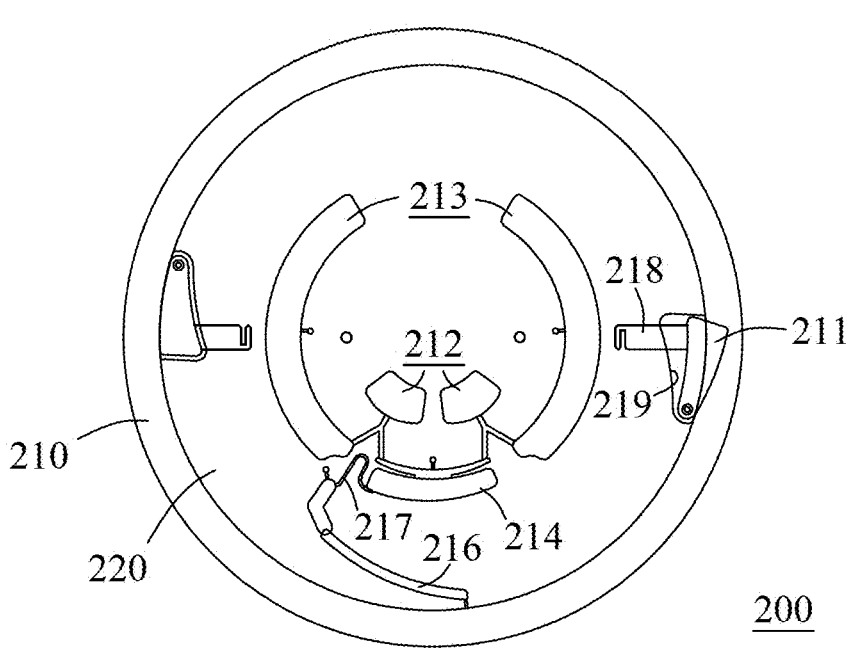
FIG. 2B is a top view of the inner separation disk of the mixing disk assembly of the present invention.
Figure 3:
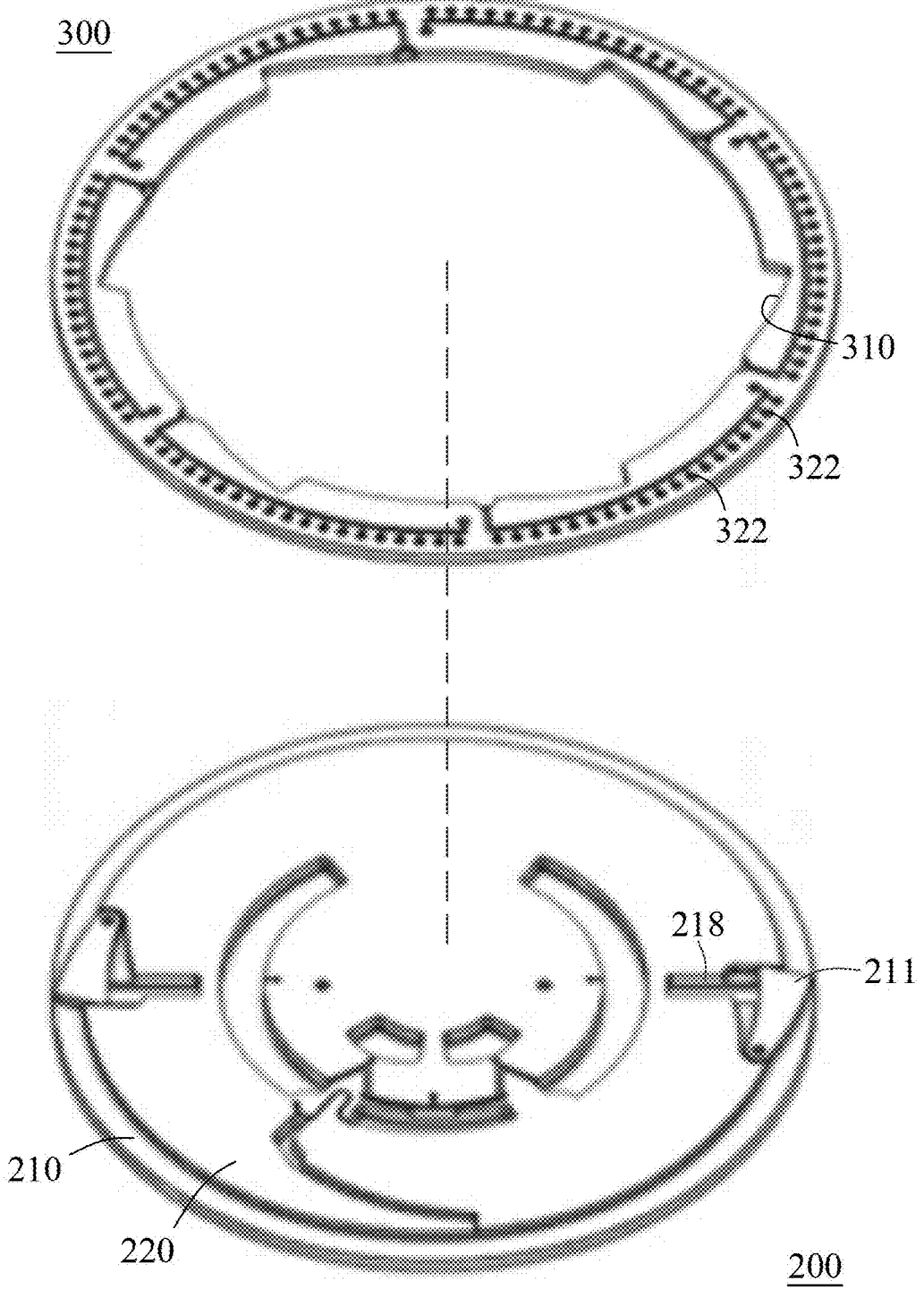
FIG. 3 is an exploded perspective view of the mixing disk assembly of the present invention.

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

With reference to FIGS. 1, 2A, 2B, and 3, the present invention provides a mixing disk assembly 100 comprising an inner separation disk 200 and an outer collection disk 300. The inner separation disk 200 has a first ring part 210 and a second ring part 220 disposed on the outer periphery of the first ring part 210. The first ring part 210 has at least two pawls 211, and in this embodiment, two of these pawls 211 are symmetrically positioned on a left side and a right side of the first ring part 210. The outer collection disk 300 is rotatably and slidably engaged with the second ring part 220 of the inner separation disk 200. The outer collection disk 300 has at least two tapered recesses 310 corresponding to the pawls 211. When the multiple pawls 211 of the first ring part 210 engage with some of the multiple tapered recesses 310, the outer collection disk 300 will rotate synchronously with the inner separation disk 200.

In some of the preferred embodiment of the present invention, when the inner separation disk 200 rotates on the centrifugal platform (not shown in the figures), such the centrifugal platform will indirectly drive the outer collection disk 300 to rotate synchronously by engaging the pawls 211 of the first ring part 210 of the inner separation disk 200 with the tapered recesses 310 of the outer collection disk 300. Wherein the number of the tapered recesses 310 may be greater than or equal to the number of the pawls 211, i.e., the multiple pawls 211 need only engage with some of the multiple tapered recesses 310 to accomplish the purpose of driving the outer collection disk 300 to rotate synchronously with the inner separation disk 200.

The first ring part 210 of the inner separation disk 200 has at least two eluent reservoirs 212, at least two recycling chambers 213, and at least one mixing chamber 214. The at least two eluent reservoirs 212 are in fluid communication with the at least two recycling chambers 213 and the at least one mixing chamber 214 through a metering unit 215. Specifically, as shown in FIGS. 1, 2A, 2B, and 3, in an embodiment of the present invention, the first ring part 210 of the inner separation disk 200 may have a first eluent reservoir 212a, a second eluent reservoir 212b, a first recycling chamber 213a, a second recycling chamber 213b, a mixing chamber 214, a first metering unit 2151, and a second metering unit 2152. Wherein the first eluent reservoir 212a is in a fluid communication relationship with the first recycling chamber 213a and the mixing chamber 214 through the first metering unit 2151, while the second eluent reservoir 212b is also in a fluid communication relationship with the second recycling chamber 213b and the mixing chamber 214 through the second metering unit 2152.

In one of the preferred embodiments, the first eluent reservoir 212a and the second eluent reservoir 212b are positioned close to a disk center of the first ring part 210 in a radial direction, while the first recycling chamber 213a, the second recycling chamber 213b, and the mixing chamber 214 are positioned away from the disk center of the first ring part 210 in the radial direction and the positions of the first eluent reservoir 212a and the second eluent reservoir 212b. As shown in the figures, the first metering unit 2151 on the left side is preferably having an inverted Y-shaped structure designating a first metering channel 2151a firstly extended from the first eluent reservoir 212a. Further, dividing as the inverted Y-shaped structure are a second metering channel 2151b toward to the recycling chamber 213a and a third metering channel 2151c toward mixing chamber 214. A symmetrical design for the second metering unit 2152 on the right side are presented by having the inverted Y-shaped structure designating a first metering channel 2152a firstly extended from the second eluent reservoir 212b. Further, dividing as the inverted Y-shaped structure are a second metering channel 2152b toward to the mixing chamber 214 and a third metering channel 2152c toward the recycling chamber 213b.

The first ring part 210 of the inner separation disk 200 further comprises a separation column 216, and the separation column 216 is in a fluid communication relationship with the mixing chamber 214 through a siphoning channel 216. Corresponding to an output of the siphoning channel 216, the outer collection disk 300 comprises multiple fraction collectors 320 comprising a feeding channel 321 and multiple collecting chambers 322. As shown in FIG. 1, there are 6 fraction collectors 320 in this preferred embodiment. Each individual collecting chamber 322 of each fraction collector 320 collects an eluate from the separation column 216 through the feeding channel 321.

With reference to FIGS. 1, 2A, 2B and 3, another preferred embodiment of the present invention comprises the multiple pawls 211 of the inner separation disk 200 able to be resiliently engaged with the first ring part 210 by a spring 218. By such, the multiple pawls 211 can be switched as desires to engage with the different tapered recesses 310. For example, when the inner separation disk 200 and the outer collection disk 300 rotate synchronously in a counterclockwise direction, the inner separation disk 200 is controlled to decelerate or to have a sudden stop and the outer collection disk 300 will continue to rotate in original rotational speed due to inertial force causing the multiple pawls 211 to be pressed against a corresponding tapered recess 219 of the second ring part 220 along an inner edge of the outer collection disk 300. Subsequently, when the following tapered recesses 310 of the outer collection disk 300 rotate to the pawls 211 position, the spring 218 can push the pawls 211 allowing the pawls 211 to engage with the following tapered recesses 310 again resulting the outer collection disk 300 to be able to be rotated with the inner separation disk 200 again.

Some preferred operation steps for the mixing disk assembly 100 of the present invention will be described below. The mixing disk assembly 100 of the present invention could be used for any separation, chromatography, or elution process.

Figure 4:
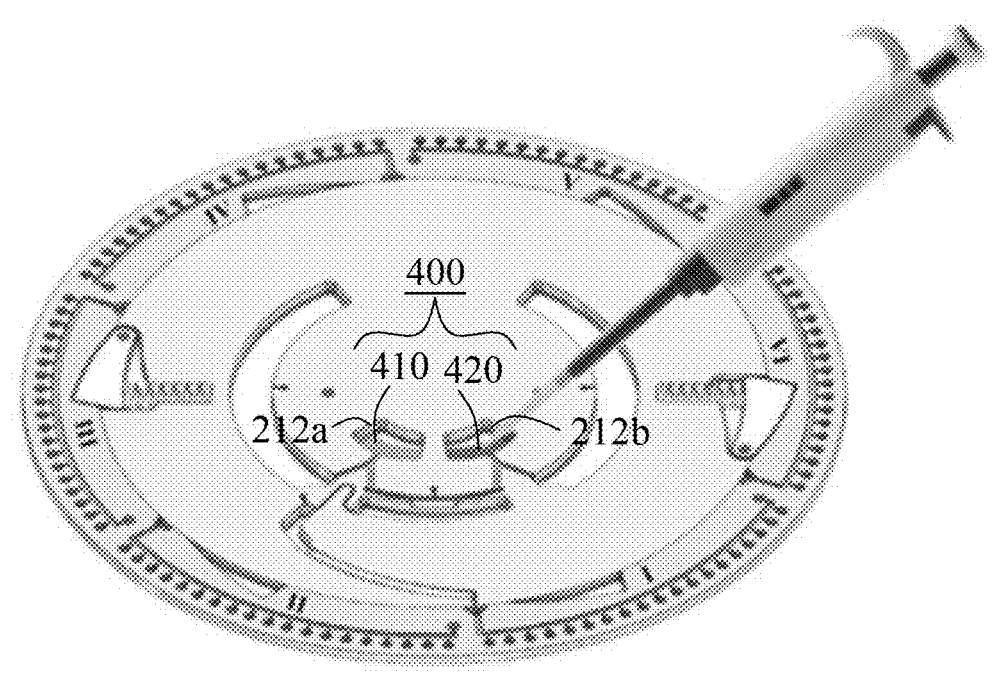
FIG. 4 is a schematic diagram of the loading phase when using the mixing disk assembly of the present invention.

Loading Phase: with reference to FIG. 4, when the centrifugal platform (not shown) is applied to the mixing disk assembly 100 of the present invention in the loading phase, at least two eluents 400 (i.e., a first eluent 410 and a second eluent 420) are loaded into the first eluent reservoir 212*a* and the second eluent reservoir 212*b* respectively.

Figure 5:
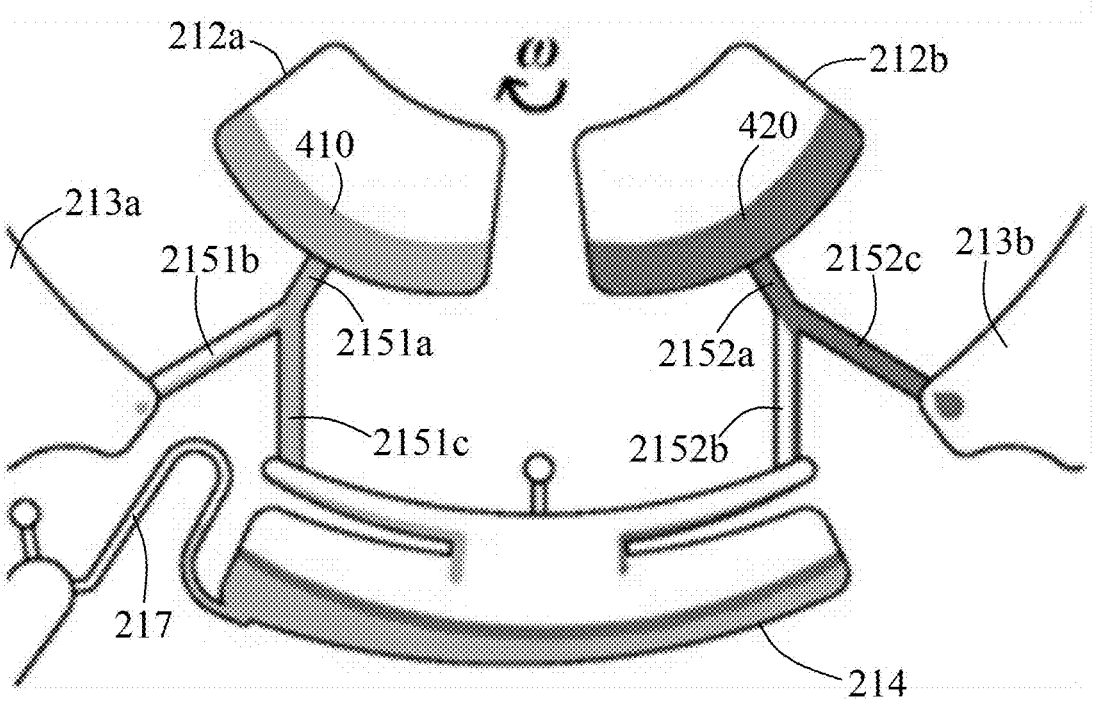
FIG. 5 is a schematic diagram of the metering phase when using the mixing disk assembly of the present invention.

Metering Phase: as shown in FIG. 5, during the metering phase, when the centrifugal platform rotates to a specific rotational speed, the first eluent 410 and the second eluent 420 in the first eluent reservoir 212*a* and the second eluent reservoir 212*b* flow into the mixing chamber 214 through the first metering unit 2151 and the second metering unit 2152, respectively. In other words, during the metering phase, when the centrifugal platform rotates at the specific rotational speed, the centrifugal force/Coriolis force generated will drive the first eluent 410 from the first eluent reservoir 212*a* to the first metering unit 2151 and the second eluent 420 from the second eluent reservoir 212*b* to the second metering unit 2152, in which the Coriolis force will also cause a lateral movement. At this time, the first eluent 410 from the right outlet of the first metering unit 2151 and the second eluent 420 from the left outlet of the second metering unit 2152 merge into the mixing chamber 214, while the first eluent 410 from the left outlet of the first metering unit 2151 and the second eluent 420 from the right outlet of the second metering unit 2152 flow into the respective first recycling chamber 213*a* and the second recycling chamber 213*b* for recycling. Specifically, taking the left side of the first eluent reservoir 212*a* as an example, due to the different rotational speeds of the centrifugal platform, the centrifugal force and the lateral Coriolis force cause the first eluent 410 to flow into the second metering channel 2151*b* and the third metering channel 2151*c* in a specific ratio, e.g., in a ratio of 3:7, wherein the 3 in the ratio of the first eluent 410 flows through the left second metering channel 2151*b* into the first recycling chamber 213*a*, and the 7 in the ratio flows through the right third metering channel 2151*c* into the mixing chamber 214. The same is true for the right side with the second eluent 420, but the 3 in the ratio of the first eluent 410 flows through the left second metering channel 2152*b* into the mixing chamber 214 and the 7 in the ratio flows through the right third metering channel 2152*c* into the second recycling chamber 213*b*. Thus, during this metering phase, different rotational speeds can achieve the effect of mixing the first eluent 410 and the second eluent 420 in different ratios, including but not limited to 2:8, 1:9, 4:6, 5:5, etc.

Figure 6:
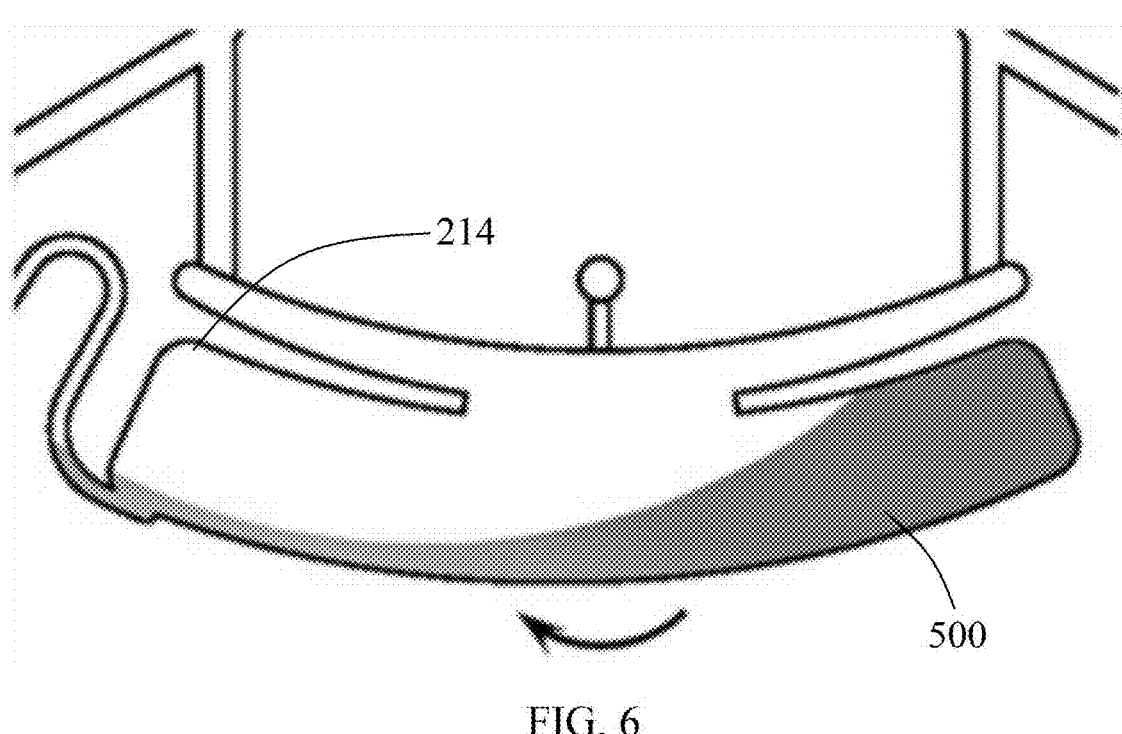
FIG. 6 is a schematic diagram of the mixing phase when using the mixing disk assembly of the present invention.

Mixing Phase: as shown in FIG. 6, during the mixing phase of the mixing disk assembly 100 of the present invention, the centrifugal platform employs an acceleration/deceleration mode to mix the first eluent 410 and the second eluent 420 in the mixing chamber 214 to obtain a mixed eluent 500. Specifically, during the mixing phase, the centrifugal platform undergoes repeated acceleration and deceleration rotations several times to ensure thorough mixing of the first eluent 410 and the second eluent 420 in the mixing chamber 214 while the outer collection disk 300 is held stationary accordingly.

Figure 7:
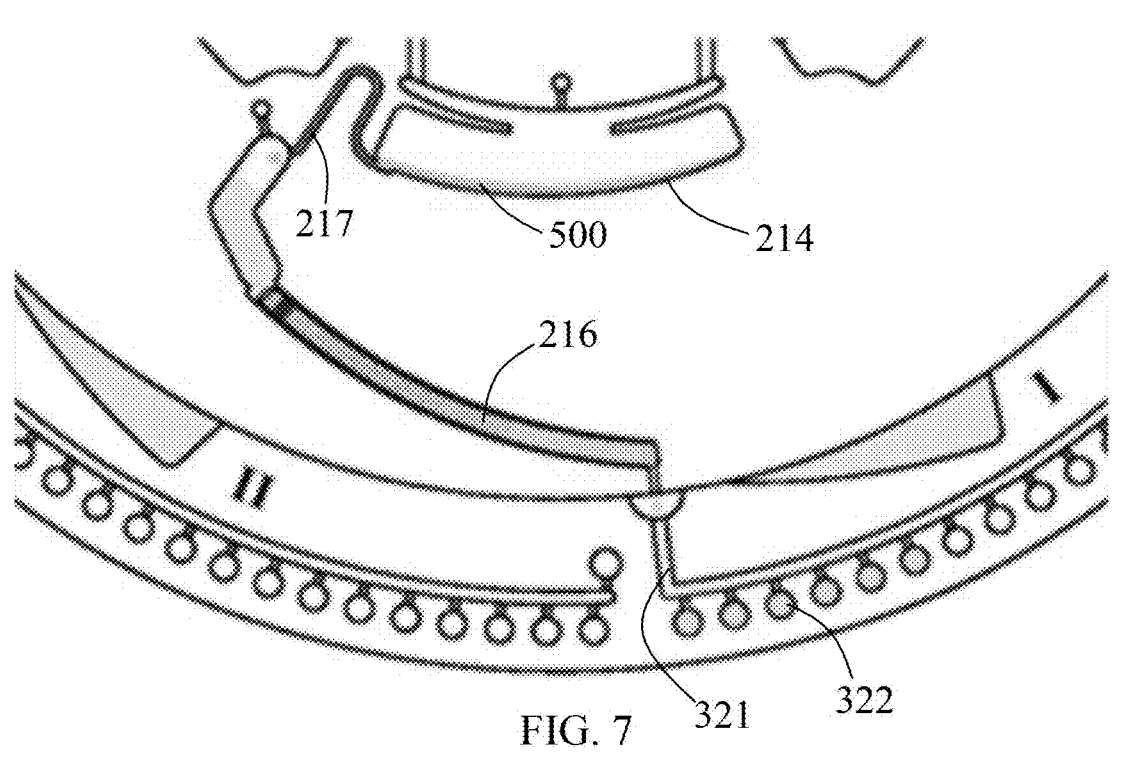
FIG. 7 is a schematic diagram of the first separation phase and collection phase when using the mixing disk assembly of the present invention.

Separation Phase: as shown in FIG. 7, during the separation phase of the mixing disk assembly 100 of the present invention, the centrifugal platform employs a high-speed rotation mode to elute a sample (not shown in figures) from the separation column by the mixed eluent 500. Namely, during the separation phase, the centrifugal platform is rotated at an accelerating rotational speed, which causes the mixed eluent 500 to fill the siphoning channel 217 under the influence of inertia, and then flows into the separation column 216 by a siphoning action. The rotation of the centrifugal platform is then switched to a constant rotational speed for several minutes to elute the sample with mixed eluent 500.

Collection Phase: also as shown in FIG. 7, during the collection phase of the mixing disk assembly 100 of the present invention, the centrifugal platform collects an eluate (not shown in figures) flowing out from the outlet of the separation column 216 by the multiple fraction collectors 320.

Figure 8:
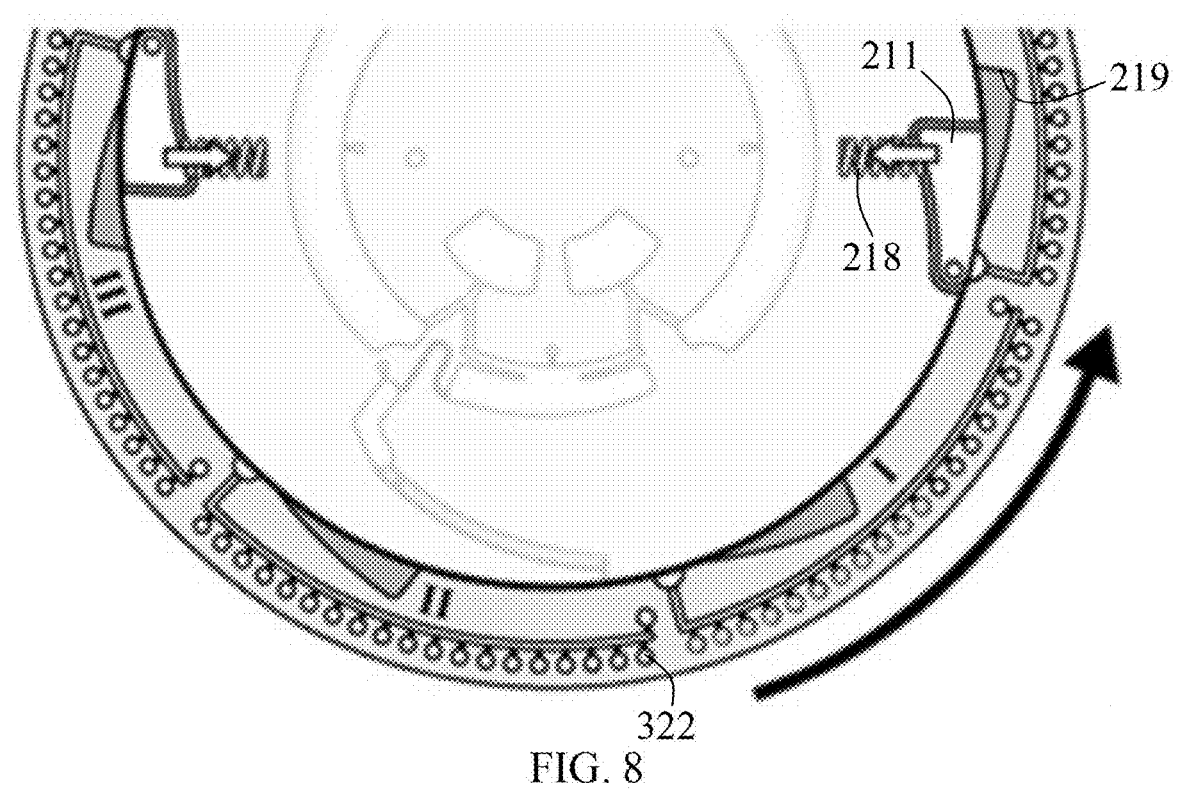
FIG. 8 is a schematic diagram of the switching phase when using the mixing disk assembly of the present invention.
Figure 9:
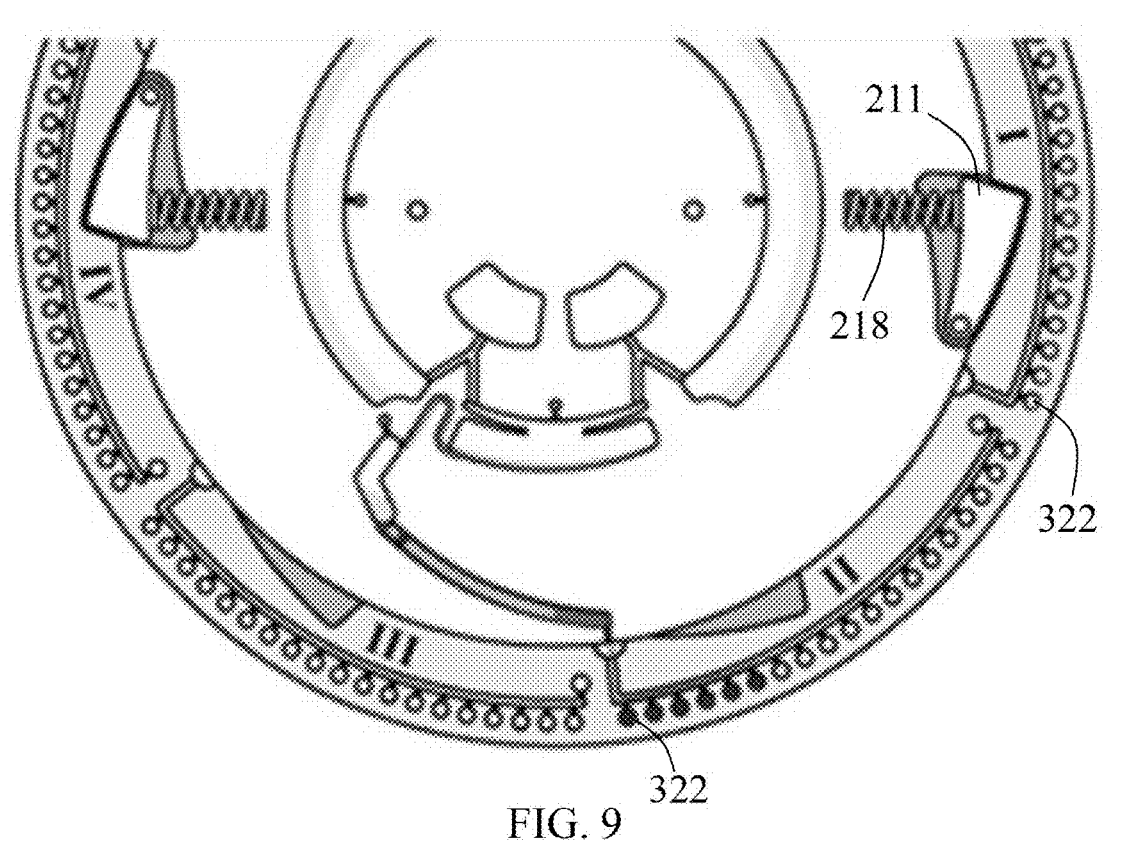
FIG. 9 is a schematic diagram of the second separation and collection phases when using the mixing disk assembly of the present invention.

Switching Phase: as shown in FIG. 8, during the switching phase of the mixing disk assembly 100 of the present invention, the centrifugal platform induces a rotational speed difference between the inner separation disk 200 and the outer collection disk 300 by stopping or reducing the rotational speed, thereby causing the outer collection disk 300 to rotate relative to the inner separation disk 200. Namely, during the switching phase, the stopping or sudden deceleration of the centrifugal platform causes the outer collection disk 300 to continue to rotate relative to the inner separation disk 200 due to inertia, causing the spring 218 to be compressed and the pawl 211 to slide into the next tapered recess 310. At this point, the fraction collectors 320 that have collected the eluate move counterclockwise, while those that have not collected the eluate are conveyed to the outlet of the separation column 216 for the next eluate collection process, as shown in FIG. 9.

In this way, by repeating the six phases described above and adjusting the composition of the eluent by changing the rotational speed of the centrifugal platform during the metering phase, a series of eluents with different compositions can be produced, and the components of the sample mixture can be eluted and collected sequentially. Finally, the eluate in the multiple fraction collectors 320 can be quantitatively analyzed by optical detection.

Figure 10:
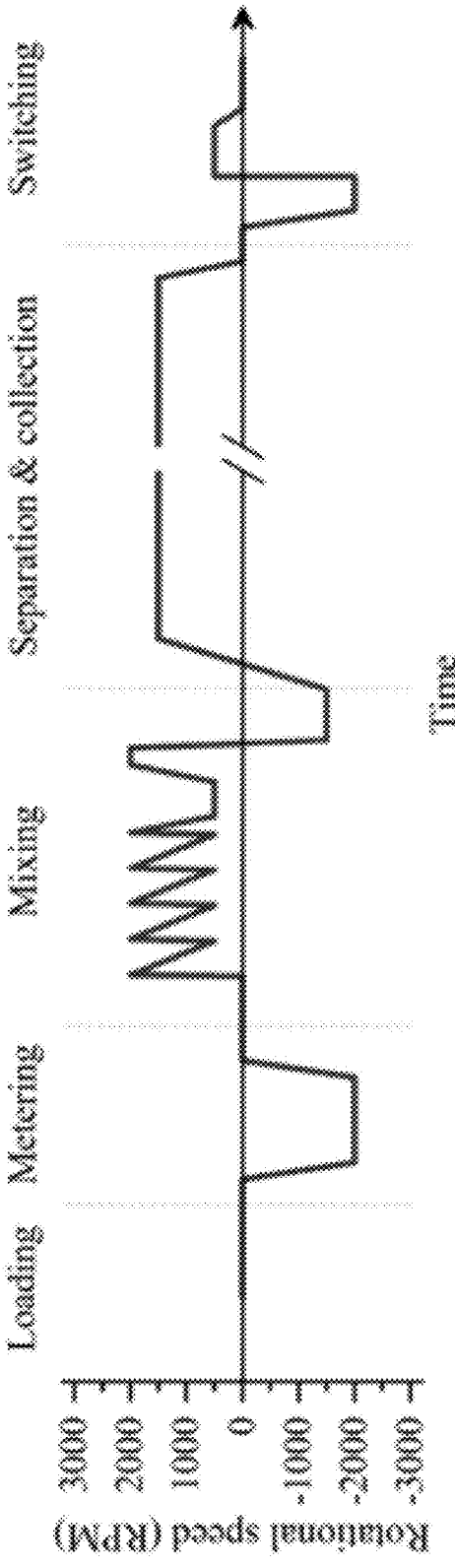
FIG. 10 is a schematic diagram showing different rotational speeds and times at each phase of the preferred embodiment during the chromatographic experimental process of the mixing disk assembly of the present invention.

Referring to FIG. 10, which shows the preferred embodiment of the mixing disk assembly of the present invention with different rotational speeds and times at each phase during use to obtain the stepwise gradient elution of the mixed eluent 500 with different compositions. In FIG. 10, any applicable centrifugal platform, such as a centrifuge, is used to actuate the inner separation disk 200 while the outer collection disk 300 is driven by the inner separation disk 200 due to the temporary fixation of the pawls 211 with the tapered recesses 310.

During the loading phase, the first eluent 410 and the second eluent 420 are loaded into the first eluent reservoir 212*a* and the second eluent reservoir 212*b*, respectively, while the centrifugal platform is stationary. During the metering phase, the centrifugal platform rotates at the specific rotational speed, generating the centrifugal force that drives the first eluent 410 and the second eluent 420 from the respective first eluent reservoir 212*a* and second eluent reservoir 212*b* into the metering unit 215, while the Coriolis force causes the fluid to move laterally, resulting in different flow rates in the second metering channel and the third metering channel of the first metering unit 2151 and the second metering unit 2152, respectively. In most cases, the first eluent 410 and the second eluent 420 are divided into two fluid streams. The fluid from the right third metering channel of the first metering unit 2151 and the fluid from the left second metering channel of the second metering unit 2152 merge into the mixing chamber 214, wherein the specific rotational speed is used during the metering phase to control the composition of the mixed first eluent 410 and second eluent 420. Meanwhile, the fluid from the left second metering channel 2151a of the first metering unit 2151 and the fluid from the right third metering channel 2152c of the second metering unit 2152 flow into the respective first recycling chamber 213a and second recycling chamber 213b for recycling.

In the mixing phase, the centrifugal platform in this embodiment begins to rotate rapidly to 2000 RPM (CW) by an acceleration of 10,000 RPM/s, then slowly decelerates to 500 RPM (CW) by a deceleration of 500 RPM/s, and repeats this acceleration and deceleration process for five times. Such operation ensures thoroughly mixing result of the first eluent 410 and the second eluent 420 in the mixing chamber 214, while the outer collection disk 300 remains stationary relative to the inner separation disk 200. The platform then accelerates at 10,000 RPM/s to 1000 RPM (CCW) for 5 seconds, causing the mixed eluent 500 to fill the siphoning channel 217 due to inertial force and then flow into the separation column 216 by siphoning action. During the separation phase, the rotational speed is accelerated to 1500 RPM (CW) for several minutes to elute samples from the separation column 216 by the mixing eluent 500. In the collection phase, the eluate flowing out of the outlet of the separation column is collected by the fraction collector (as indicated by I in the figure). In the switching phase, the platform rotates at the rotational speed of 2000 RPM (CCW) for 3 seconds and then suddenly decelerates to the 500 RPM (CW) at 50,000 RPM/s causing the outer collection disk 300 to move counterclockwise relative to the inner separation disk 200 due to inertia, which leads the spring to be compressed and the pawl 211 to slide into the next tapered recess 310. As a result, the fraction collector I moves counterclockwise while the fraction collector II is conveyed to the outlet of the separation column 216 for the next elution collection process. By repeating these six phases and adjusting the platform rotational speed during the metering phase to modify the composition of the eluent, a series of eluents with different compositions can be produced, and the components of the sample mixture can be sequentially eluted and collected. Lastly, the eluate in the fraction collector can be quantitatively analyzed by chemical, optical, medical, or semiconductor-related detection.

In summary, the mixing disk assembly 100 of the present invention used on the centrifugal platform with stepwise gradient elution liquid chromatography enables the use of the different inner separation disks 200 in conjunction with the outer collection disk 300 to achieve different chromatographic effects. Furthermore, the mixing disk assembly 100 of the present invention integrates centrifugal force and Coriolis force to induce proportional metering distribution, thereby enabling control of the composition of mixed eluent by adjusting the operating conditions of centrifugal platform. Lastly, the mixing disk assembly 100 of the present invention employs a rotational switching system based on the ratchet mechanism that enables automatic switching of the combined inner separation disk 200 and outer collection disk 300 through rotational inertia changes induced by stopping or sudden deceleration of the centrifugal platform, thereby achieving an automated centrifugal chromatography platform, streamlining processes, and reducing chromatographic analysis costs. In addition, by adjusting the rotational speed of the centrifugal platform, the composition of the mixed eluent can be controlled, thereby facilitating gradient elution on the centrifugal platform, and by the ratchet mechanism and the spring, automatic switching of the collection chambers can be accomplished by rotational inertia changes, thereby reducing cross-contamination during eluent collection. As a result, the mixing disk assembly 100 of the present invention can replace the conventional elution methods that are adjusted via the precision injectors and the mixers.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A mixing disk assembly for use on a centrifugal platform, comprising:

an inner separation disk with a first ring part and a second ring part disposed on the outer periphery of the first ring part, with the first ring part having multiple pawls;

the first ring part of the inner separation disk is provided with at least two eluent reservoirs, at least two recycling chambers, and at least one mixing chamber, wherein the at least two eluent reservoirs are in fluid communication with the at least two recycling chambers and the at least one mixing chamber through at least two metering units, and the at least one mixing chamber is in fluid communication with a siphoning channel and a separation column; and an outer collection disk rotatably mounted on the second ring part of the inner separation disk, the outer collection disk having multiple tapered recesses that when the multiple pawls of the first ring part engage some of the multiple tapered recesses, the outer collection disk rotates synchronously with the inner separation disk, wherein each fraction collector comprises a feeding channel and multiple collecting chambers; and the outer collection disk has multiple fraction collectors in fluid communication with the separation column through a collection tube; and when a rotational speed difference between the inner separation disk and the outer collection disk occurs, causing the outer collection disk to rotate relative to the inner separation disk and allowing the pawl to exit one tapered recess and switch to another tapered recess.

2. The mixing disk assembly according to claim 1, wherein the multiple pawls of the inner separation disk are each resiliently mounted on the first ring part by a spring.

3. The mixing disk assembly according to claim 1, wherein a first metering unit on a left side comprises an inverted Y-shaped structure designating a first metering channel firstly extended from a first eluent reservoir; further dividing as the inverted Y-shaped structure are a second metering channel toward to the recycling chamber and a third metering channel toward the mixing chamber; and a second metering unit on a right side comprises the inverted Y-shaped structure designating a first metering channel firstly extended from a second eluent reservoir and further dividing as the inverted Y-shaped structure are a second metering channel toward to the mixing chamber and a third metering channel toward the recycling chamber.

4. The mixing disk assembly according to claim 1, wherein during a loading phase of the centrifugal platform, at least two corresponding eluents are loaded into the respective at least two eluent reservoirs.

5. The mixing disk assembly according to claim 2, wherein during a loading phase of the centrifugal platform, at least two corresponding eluents are loaded into the respective at least two eluent reservoirs.

6. The mixing disk assembly according to claim 3, wherein during a loading phase of the centrifugal platform, at least two corresponding eluents are loaded into the respective at least two eluent reservoirs.

7. The mixing disk assembly according to claim 4, wherein during a metering phase, the centrifugal platform rotates at a specific rotational speed to allow the at least two eluents in the at least two eluent reservoirs to flow through the metering unit into the at least one mixing chamber and recycling chambers.

8. The mixing disk assembly according to claim 7, wherein by varying the rotational speed of the centrifugal platform, a first eluent and a second eluent flow through a second metering channel and third metering channel in a specific ratio into a first recycling chamber, a second recycling chamber, and the mixing chamber.

9. The mixing disk assembly according to claim 8, wherein during a mixing phase, the centrifugal platform employs an acceleration and deceleration mode to mix the at least two eluents in the at least one mixing chamber to obtain a mixed eluent.

10. The mixing disk assembly according to claim 9, wherein during a separation phase, the centrifugal platform employs a high-speed rotation mode to elute a sample from the separation column by the mixed eluent.

11. The mixing disk assembly according to claim 10, wherein during a collection phase, the centrifugal platform collects an eluate flowing out from an outlet of the separation column by multiple collecting chambers of the multiple fraction collectors through the feeding channel.

12. The mixing disk assembly according to claim 11, wherein during a switching phase, the centrifugal platform induces the rotational speed difference between the inner separation disk and the outer collection disk by stopping or reducing the rotational speed, thereby causing the outer collection disk to rotate relative to the inner separation disk.

* * * * *